United States Patent [19]

Andoh et al.

[11] Patent Number: 5,348,203
[45] Date of Patent: Sep. 20, 1994

[54] MOLTEN STEEL POURING NOZZLE

[75] Inventors: Mitsuru Andoh; Noriaki Yamauchi, both of Ena, Japan

[73] Assignee: Akechi Ceramics Co., Ltd., Ena, Japan

[21] Appl. No.: 110,088

[22] Filed: Aug. 20, 1993

[30] Foreign Application Priority Data

Sep. 18, 1992 [JP] Japan ................................. 4-275447

[51] Int. Cl.$^5$ ............................................. B22D 41/54
[52] U.S. Cl. .................................. 222/606; 266/236; 266/286
[58] Field of Search ............... 266/236, 280, 286; 222/606, 607, 597; 501/100, 94, 99

[56] References Cited

U.S. PATENT DOCUMENTS

| | | | |
|---|---|---|---|
| 3,752,372 | 8/1973 | Mitchell, III | 501/100 |
| 3,753,744 | 8/1973 | Komaru et al. | 501/100 |
| 5,188,989 | 2/1993 | Winkelbauer et al. | 501/100 |
| 5,198,126 | 3/1993 | Lee | 222/606 |

FOREIGN PATENT DOCUMENTS

| | | |
|---|---|---|
| 0126560 | 11/1984 | European Pat. Off. |
| 0423793 | 4/1991 | European Pat. Off. |
| 49-119827 | 11/1974 | Japan |
| 49-119909 | 11/1974 | Japan |
| 49-121737 | 11/1974 | Japan |
| 50-039628 | 4/1975 | Japan |
| 05000842 | 1/1993 | Japan |

OTHER PUBLICATIONS

The Tekko Binran (*Iron and Steel Handbook*), Third edition, vol. II, Ironmakin and Steelmaking, published on Sep. 20, 1980, p. 802.

*Primary Examiner*—Scott Kastler
*Attorney, Agent, or Firm*—Frishauf, Holtz, Goodman & Woodward

[57] ABSTRACT

A molten steel pouring nozzle which comprises: a nozzle body comprising an alumina-graphite refractory, having, along the axis thereof, a bore through which molten steel flows; and an outer refractory layer arranged on an outside portion of the nozzle body so as to be integral with the nozzle body and to be flush with an outer surface thereof, the outer refractory layer being arranged on a portion of the outside portion of the nozzle body, which portion is in contact, when a lower portion of the molten steel pouring nozzle is immersed into molten steel, with the open air without being immersed into the molten steel, and the outer refractory layer consisting essentially of:

| | |
|---|---|
| alumina ($Al_2O_3$) | from 40 to 75 wt. %, |
| carbon (C) | from 10 to 30 wt. %, |
| silica ($SiO_2$) | from 1 to 30 wt. %, |
| silicon carbide (SiC) and | from 1 to 20 wt. %, |
| low-melting glass | from 1 to 10 wt. %. |

11 Claims, 1 Drawing Sheet

MOLTEN STEEL POURING NOZZLE

As far as we know, there is available the following prior art document pertinent to the present invention:

The Tekko Binran (Iron and Steel Handbook), Third edition, Vol. II, Ironmaking and Steelmaking, published on Sep. 20, 1980, page 802.

The contents of the prior art disclosed in the above-mentioned prior art document will be discussed hereafter under the heading of the "BACKGROUND OF THE INVENTION."

BACKGROUND OF THE INVENTION

Field of the Invention

The present invention relates to a molten steel pouring nozzle which permits, when continuously casting molten steel, effective prevention of deterioration of the structure of a refractory forming the nozzle which has a bore through which molten steel flows, caused by oxidation of the refractory from the outer surface thereof as a result of the contact with the open air.

Related Art Statement

A continuous casting of molten steel is conducted, for example, by pouring molten steel received from a ladle into a tundish, through a molten steel pouring nozzle secured to a bottom wall of the tundish, into a vertical mold arranged below the molten steel pouring nozzle, to form a cast steel strand, and continuously withdrawing the thus formed cast steel strand into a long strand. In this process, the molten steel pouring nozzle has functions of inhibiting molten steel received from the ladle into the tundish and poured into the mold from being oxidized due to the contact with the open air to minimize degradation of the quality of the cast steel strand, and of rectifying the flow of molten steel poured into the mold to prevent impurities such as slag and nonmetallic inclusions present near the molten steel surface in the tundish and the mold from being entrapped into molten steel, and of preventing splashes of poured molten steel from scattering on the side walls of the mold to ensure safe operations.

As a molten steel pouring nozzle having the functions as mentioned above, there is commonly used a molten steel pouring nozzle which comprises a nozzle body comprising an alumina-graphite ($Al_2O_3$-C) refractory and an outer refractory layer comprising a zirconia-carbon ($ZrO_2$-C) refractory which is also called a slag-line portion and is in contact with a molten mold powder and a molten slag.

However, the above-mentioned conventional molten steel pouring nozzle has the following problem:

The molten steel pouring nozzle is preheated to a temperature within a range of from about 700° to about 1,200° C. before service, and is further heated to a high temperature by molten steel during the casting. During the preheating and the casting as mentioned above, the structure of the refractory forming the molten steel pouring nozzle is deteriorated through oxidation of the refractory from the outer surface thereof caused by oxygen in the open air.

A method for solving the above-mentioned problem is disclosed in the Tekko Binran (Iron and Steel Handbook), Third edition, Vol. II, Ironmaking and Steelmaking, published on Sep. 20, 1980, page 802. More specifically, a liquid oxidation preventive agent, which comprises an $SiO_2$-$Al_2O_3$ aggregate and a binder such as potassium silicate, is applied onto an outer surface of the nozzle in order to prevent deterioration of the structure of the refractory forming the nozzle caused by the oxidation. In the molten steel pouring nozzle thus applied with the oxidation preventive agent onto the outer surface thereof (hereinafter referred to as the "prior art nozzle"), the heat given during the above-mentioned preheating and casting vitrifies the oxidation preventive agent, thus interrupting the contact between the outer surface of the nozzle and the open air. As a result, oxidation resistance of the nozzle is improved. However, the above-mentioned prior art nozzle has the following problems:

As shown in FIG. 1, in the prior art nozzle 1, a steel shell 5 is attached, in close contact, through a refractory mortar, onto an outer surface of an upper portion of a nozzle body 2 of the nozzle 1, for the purpose of ensuring an appropriate engagement between the nozzle 1 and a means (not shown) of supporting the nozzle 1, and reinforcing the strength of the upper portion of the nozzle body 2 of the nozzle 1. The temperature of the nozzle body 2 sharply varies during the casting. Along with the sharp variation of temperature of the nozzle body 2, the steel shell 5 expands and shrinks, thus resulting in a displacement of the steel shell 5. As a result, a film of the vitrified oxidation preventive agent, formed on the outer surface of the nozzle body 2, is partially scraped off by means of the steel shell 5 at a lower end portion thereof. In a portion where the film of the vitrified oxidation preventive agent has been scraped off, therefore, the nozzle body 2 is gradually oxidized by the contact with the open air. More particularly, carbon and a binder component contained in the alumina-graphite ($Al_2O_3$-C) refractory forming the nozzle body 2 are decarburized and disappear, thus causing a considerable decrease in strength of the nozzle 1. In addition, deterioration of the structure of the refractory forming the nozzle body 2 progresses, along with the lapse of time, from the outer surface of the nozzle body 2 toward a bore 3 provided therein. Corrosion pits are consequently pierced in the nozzle body 2, or breakage or cracking occurs in the nozzle 1, exerting seriously adverse effects on the continuous casting operation.

Because of the above-mentioned problems, it is difficult to stably use, for a long period of time for the continuous casting of molten steel, the molten steel pouring nozzle applied with the oxidation preventive agent on the outer surface thereof.

Under such circumstances, there is a strong demand for development of a molten steel pouring nozzle which prevents oxidation from the outer surface thereof caused by the contact with the open air, and permits stable use thereof for a long period of time for the continuous casting of molten steel, but such a molten steel pouring nozzle has not as yet been proposed.

SUMMARY OF THE INVENTION

An object of the present invention is therefore to provide a molten steel pouring nozzle which permits, when continuously casting molten steel, effective prevention of deterioration of the structure of a refractory forming the nozzle which has a bore through which molten steel flows, caused by oxidation of the refractory from the outer surface thereof as a result of the contact with the open air.

In accordance with one of the features of the present invention, there is provided a molten steel pouring nozzle which comprises:

a nozzle body comprising an alumina-graphite refractory, having, along the axis thereof, a bore through which molten steel flows; and an outer refractory layer arranged on an outside portion of said nozzle body so as to be integral with said nozzle body and to be flush with an outer surface thereof, said outer refractory layer being arranged on a portion of said outside portion of said nozzle body, which portion is in contact, when a lower portion of said molten steel pouring nozzle is immersed into molten steel, with the open air without being immersed into said molten steel, and said outer refractory layer consisting essentially of:

| | |
|---|---|
| alumina ($Al_2O_3$) | from 40 to 75 wt. %, |
| carbon (C) | from 10 to 30 wt. %, |
| silica ($SiO_2$) | from 1 to 30 wt. %, |
| silicon carbide (SiC) and | from 1 to 20 wt. %, |
| low-melting glass | from 1 to 10 wt. %. |

DETAILED DESCRIPTION OF PREFERRED EMBODIMENTS

Figure 1:
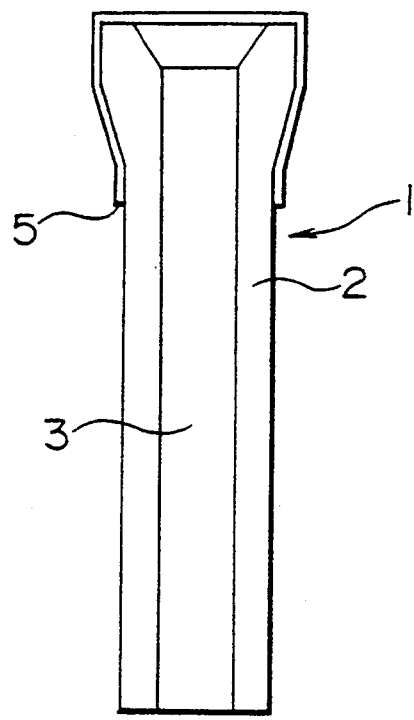
FIG. 1 is a schematic vertical sectional view illustrating a conventional molten steel pouring nozzle as an immersion nozzle.

From the above-mentioned point of view, extensive studies were carried out to develop a molten steel pouring nozzle which permits, when continuously casting molten steel, effective prevention of deterioration of the structure of a refractory forming the nozzle which has a bore through which molten steel flows, caused by oxidation of the refractory from the outer surface thereof as a result of the contact with the open air.

As a result, the following findings were obtained: It is possible to effectively inhibit the structure of a refractory forming a molten steel pouring nozzle from being deteriorated, during the preheating of the nozzle and during the casting of molten steel, through oxidation of the refractory from the outer surface thereof caused by oxygen in the open air, by using a molten steel pouring nozzle prepared by integrally forming, on an outside portion of a nozzle body of the molten steel pouring nozzle comprising an alumina-graphite refractory, an outer refractory layer consisting essentially of from 40 to 75 wt. % alumina ($Al_2O_3$), from 10 to 30 wt. % carbon (C), from 1 to 30 wt. % silica ($SiO_2$), from 1 to 20 wt. % silicon carbide (SiC) and from 1 to 10 wt. % low-melting glass.

The present invention was developed on the basis of the above-mentioned findings, and the molten steel pouring nozzle of the present invention comprises:

a nozzle body comprising an alumina-graphite refractory, having, along the axis thereof, a bore through which molten steel flows; and an outer refractory layer arranged on an outside portion of said nozzle body so as to be integral with said nozzle body and to be flush with an outer surface thereof, said outer refractory layer being arranged on a portion of said outside portion of said nozzle body, which portion is in contact, when a lower portion of said molten steel pouring nozzle is immersed into molten steel, with the open air without being immersed into said molten steel, and said outer refractory layer consisting essentially of:

| | |
|---|---|
| alumina ($Al_2O_3$) | from 40 to 75 wt. %, |
| carbon (C) | from 10 to 30 wt. %, |
| silica ($SiO_2$) | from 1 to 30 wt. %, |
| silicon carbide (SiC) and | from 1 to 20 wt. %, |
| low-melting glass | from 1 to 10 wt. %. |

The nozzle body comprising the above-mentioned alumina-graphite refractory is formed of a conventional alumina-graphite refractory.

Now, the reasons why the chemical composition of the refractory forming the outer refractory layer of the molten steel pouring nozzle of the present invention is limited as described above are as follows:

(1) Alumina ($Al_2O_3$)

Alumina ($Al_2O_3$) has a function of improving thermal resistance (i.e., strength at high temperatures) of a refractory. With an alumina content of under 40 wt. %, however, a desired effect as mentioned above is unavailable. An alumina content of over 75 wt. %, on the other hand, results in a degraded spalling resistance of the refractory. The alumina content should therefore be limited within a range of from 40 to 75 wt. %.

(2) Carbon (C)

Carbon (C) has functions of improving spalling resistance of a refractory and wetting resistance thereof against molten steel, and increasing thermal conductivity of the refractory. With a carbon content of under 10 wt. %, however, a desired effect as mentioned above is unavailable. With a carbon content of over 35 wt. %, on the other hand, wear resistance of the refractory is degraded, and it becomes difficult to stably manufacture the refractory. The carbon content should therefore be limited within a range of from 10 to 35 wt. %.

(3) Silica ($SiO_2$):

Silica ($SiO_2$) has functions of reducing a thermal expansion coefficient of a refractory, and improving the spalling resistance of the refractory. With a silica content of under 1 wt. %, however, a desired effect as mentioned above is unavailable. With a silica content of over 30 wt. %, on the other hand, the structure of the refractory is deteriorated, thus resulting in a poorer corrosion resistance of the refractory. The silica content should therefore be limited within a range of from 1 to 30 wt. %.

(4) Silicon carbide (SiC)

Silicon carbide (SIC) has functions of improving spalling resistance, thermal conductivity and oxidation resistance of a refractory. With a silicon carbide content of under 1 wt. %, however, a desired effect as mentioned above is unavailable. A silicon carbide content of over 20 wt. %, on the other hand, accelerates erosion of the refractory. The silicon carbide content should therefore be limited within a range of from 1 to 20 wt. %.

(5) Low-melting glass

The low-melting glass of the present invention consists essentially of: from 1.5 to 8.0 wt. % alumina ($Al_2O_3$), from 20.0 to 56.0 wt. % silica ($SiO_2$), from 2.5 to 14.4 wt. % calcium oxide (CaO), from 0.05 to 1.60 wt. % magnesia (MgO), from 0.25 to 6.40 wt. % potassium oxide ($K_2O$), from 0.5 to 8.0 wt. % sodium oxide ($Na_2O$), from 2.5 to 24.0 wt. % boric acid ($B_2O_3$), and from 20.0 to 50.0 wt. % boron carbide ($B_4C$).

The low-melting glass has a function of being vitrified during the preheating of a molten steel pouring nozzle and during the continuous casting of molten steel to interrupt the contact between the outer refractory layer of the nozzle and the open air, thereby improving the oxidation resistance of the nozzle. With a low-mleting glass content of under 1 wt. %, however, a desired effect as mentioned above is unavailable, leading to the progression of oxidation from the outer refractory layer of the nozzle, which in turn causes deterioration of the structure of the refractory forming the nozzle body, thus resulting in a fear of breakage of the nozzle. With a low-melting glass content of over 10 wt. %, on the other hand, corrosion resistance of the refractory becomes poorer, and splashed molten steel accelerates erosion of the outer refractory layer of the nozzle. Furthermore, the strength of the refractory forming the nozzle decreases, thus resulting in a fear of breakage of the nozzle. The low-melting glass content should therefore be limited within a range of from 1 to 10 wt. %.

The molten steel pouring nozzle provided, on the outside portion thereof, with the outer refractory layer having a thickness of under 1 mm is practically unserviceable because of the too short period of time during which an oxidation resistance effect is maintained. The molten steel pouring nozzle provided, on the outside portion thereof, with the outer refractory layer haivng a thickness of over 15 mm, on the other hand, cannot withstand a thermal shock in the initial stage of the continuous casting of molten steel. The thickness of the outer refractory layer of the molten steel pouring nozzle should therefore be limited within a range of from 1 to 15 mm.

Now, an embodiment of the molten steel pouring nozzle of the present invention is described with reference to the drawing.

Figure 2:
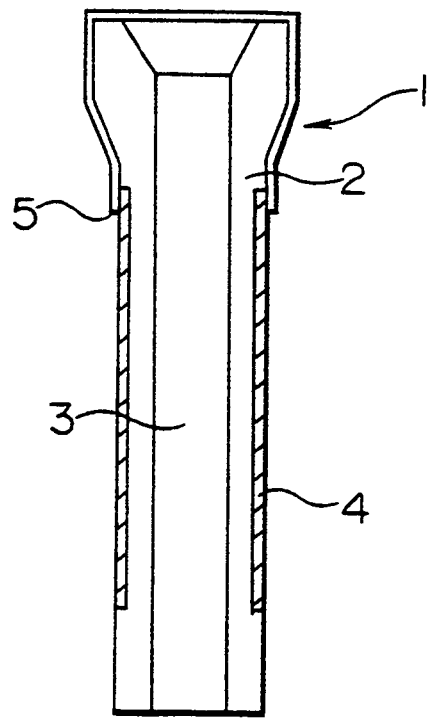
FIG. 2 is a schematic vertical sectional view illustrating an embodiment of the molten steel pouring nozzle of the present invention as an immersion nozzle.

FIG. 2 is a schematic vertical sectional view illustrating an embodiment of the molten steel pouring nozzle of the present invention as an immersion nozzle. The molten steel pouring nozzle of this embodiment is used as an immersion nozzle attached between a tundish and a vertical mold arranged below the tundish.

As shown in FIG. 2, the molten steel pouring nozzle 1 of this embodiment of the present invention comprises a nozzle body 2 having, along the axis thereof, a bore 3 through which molten steel flows; an outer refractory layer 4 arranged on an outside portion of the nozzle body 2 so as to be integral with the nozzle body 2 and to be flush with an outer surface thereof; and a steel shell 5 attached onto an outer surface of an upper portion of the nozzle body 2. The nozzle body 2 is formed, for example, of an alumina-graphite refractory having an excellent erosion resistance against molten steel. The outer refractory layer 4 is formed of a refractory having the above-mentioned chemical composition, and is arranged on a portion of the outside portion of the nozzle body 2, which portion is in contact, when a lower portion of the molten steel pouring nozzle 1 is immersed in molten steel, with the open air without being immersed into the molten steel. The steel shell 5 is attached, in close contact, through a refractory mortar, onto the outer surface of the upper portion of the nozzle body 2, and has a function of supporting the molten steel pouring nozzle 1 at a prescribed position and a function of reinforcing strength of the upper portion of the nozzle body 2.

According to the above-mentioned molten steel pouring nozzle 1, it is possible, during the continuous casting of molten steel, to stably prevent the refractory forming the nozzle from being oxidized from the outside portion thereof caused by the contact with the open air for a long period of time.

Now, the molten steel pouring nozzle of the present invention is described further in detail by means of examples while comparing with comparative examples.

EXAMPLES

First, a mixture comprising alumina ($Al_2O_3$), silica ($SiO_2$), calcium oxide (CaO), magnesia (MgO), potassium oxide ($K_2O$), sodium oxide ($Na_2O$), boric acid ($B_2O_3$) and boron carbide ($B_4C$) was melted at a temperature of at least 1,600° in an electric furnace. The resultant melt was then cooled to a room temperature to solidify the same, and then, the resultant solid was pulverized in a ball mill to prepare a low-melting glass. The thus prepared low-melting glass consisted essentially of: 3.1 wt. % alumina ($Al_2O_3$), 37.1 wt. % silica ($SiO_2$), 5.5 wt. % calcium oxide (CaO), 0.7 wt. % magnesia (MgO), 1.3 wt. % potassium oxide ($K_2O$), 4.6 wt. % sodium oxide ($Na_2O$), 14.4 wt. % boric acid ($B_2O_3$), and 33.3 wt. % boron carbide ($B_4C$).

Then, a powdery phenol resin or liquid phenol resin was added in an amount within a range of from 6 to 12 wt. % to each of blended raw materials Nos. 1 to 4, which included the above-mentioned low-melting glass and had the chemical compositions within the scope of the present invention as shown in Table 1. Each of these blended raw materials Nos. 1 to 4 added with phenol resin was mixed and kneaded to obtain a kneaded mass for an outer refractory layer 4 of a molten steel pouring nozzle 1.

On the other hand, a powdery phenol resin or liquid phenol resin was added in the same manner as described above to a blended raw material comprising a conventional alumina-graphite refractory. The blended raw material added with phenol resin was mixed and kneaded to obtain another kneaded mass for a nozzle body 2 of the molten steel pouring nozzle 1.

Each of the kneaded masses for the outer refractory layer 4 of the molten steel pouring nozzle 1 and the other kneaded mass for the nozzle body 2 of the molten steel pouring nozzle 1 were charged into a mold, and a nozzle in which a nozzle body 2 and an outer refractory layer 4 having a thickness of from 7 to 8 mm were integrally formed, was formed under a prescribed pressure. These nozzles thus formed were reduction-fired at a temperature within a range of from 1,000° to 1,200° C., to prepare molten steel pouring nozzles within the scope of the present invention (hereinafter referred to as the "samples of the invention") Nos. 1 to 4.

For comparison purposes, a liquid oxidation preventive agent was applied onto the outer surface of each of nozzles formed of refractories comprising blended raw materials Nos. 5 and 6, which had the chemical compositions outside the scope of the present invention as shown Table 1, to prepare molten steel pouring nozzles outside the scope of the present invention (hereinafter referred to as the "samples for comparison") Nos. 5 and 6.

For comparison purposes, furthermore, a powdery phenol resin or liquid phenol resin was added in an amount within a range of from 6 to 12 wt. % to each of blended raw materials Nos. 7 and 8, which included the above-mentioned low-melting glass and had the chemical compositions outside the scope of the present invention as shown in Table 1. Each of these blended raw materials Nos. 7 and 8 added with phenol resin was mixed and kneaded to obtain a kneaded mass for an outer refractory layer of a molten steel pouring nozzle.

On the other hand, a powdery phenol resin or liquid phenol resin was added in the same manner as described above to a blended raw material comprising a conventional alumina-graphite refractory. The blended raw material added with phenol resin was mixed and kneaded to obtain another kneaded mass for a nozzle body of the molten steel pouring nozzle.

Each of the kneaded masses for the outer refractory layer of the molten steel pouring nozzle and the other kneaded mass for the nozzle body of the molten steel pouring nozzle were charged into a mold, and a nozzle in which a nozzle body and an outer refractory layer having a thickness of from 7 to 8 mm were integrally formed, was formed under a prescribed pressure. These nozzles thus formed were reduction-fired at a temperature within a range of from 1,000° to 1,200° C., to prepare molten steel pouring nozzles outside the scope of the present invention (hereinafter referred to as the "samples for comparison") Nos. 7 and 8.

TABLE 1

| Chemical composition of blended raw material | Sample of the invention | | | | Sample for comparison | | | |
|---|---|---|---|---|---|---|---|---|
| | No. 1 | No. 2 | No. 3 | No. 4 | No. 5 | No. 6 | No. 7 | No. 8 |
| Alumina | 49.2 | 49.2 | 49.2 | 49.2 | 42.3 | 62.2 | 58.8 | 46.2 |
| Carbon | 19.4 | 19.4 | 19.4 | 19.4 | 30.4 | 33.7 | 23.7 | 26.6 |
| Silica | 19.8 | 18.8 | 17.4 | 16.0 | 27.3 | — | 12.6 | 14.7 |
| Silicon carbide | 9.8 | 8.1 | 7.5 | 6.1 | — | 4.1 | 4.4 | — |
| Low-melting glass | 1.8 | 3.7 | 6.5 | 9.3 | — | — | 0.5 | 12.5 |

Continuous casting was carried out using each of the samples of the invention Nos. 1 to 4 and the samples for comparison Nos. 5 to 8, with the continuous casting of molten steel from a 150-ton ladle at one time as one charge.

After the completion of the continuos casting of molten steel for ten charges, there were measured erosion and oxidation in a portion of the outside portion of each sample, which portion was in contact with the open air without being immersed into molten steel during the continuous casting. The results are shown in Table 2.

In Table 2, the extent of erosion in the outside portion of each sample is represented by the depth of erosion caused by the adhesion of splashed molten steel onto the outside portion during the continuous casting, and the extent of oxidation in the outside portion of each sample is represented by the depth of a portion of the outside portion of each sample, in which the structure of the refractory forming each sample is deteriorated through oxidation thereof caused by the contact with the open air during the continuous casting.

TABLE 2

| | Sample of the invention | | | | Sample for comparison | | | |
|---|---|---|---|---|---|---|---|---|
| | No. 1 | No. 2 | No. 3 | No. 4 | No. 5 | No. 6 | No. 7 | No. 8 |
| Erosion depth in outside portion (mm) | 0.3 | 1.1 | 2.3 | 4.2 | 0.1 | 0.1 | 0.2 | 0.1 |
| Oxidation depth in outside portion (mm) | 2.5 | 1.1 | 0.8 | 0.7 | 13.3 | 10.8 | 9.2 | 12.0 |
| Breakage ratio of sample (%) | 5.5 | 1.6 | 5.3 | 7.4 | 15.3 | 12.0 | 11.5 | 12.5 |

As is clear from Table 2, in any of the samples of the invention Nos. 1 to 4, the depth of the portion of the outer refractory layer thereof was very small, in which portion the structure of the refractory forming the sample was deteriorated through oxidation thereof caused by the contact with the open air during the continuous casting, thus demonstrating an excellent oxidation resistance.

In any of the samples for comparison Nos. 5 and 6, which represented the conventional ones, and the outer surface thereof was applied with an oxidation preventive agent, in contrast, the depth of the portion of the outside portion of the sample was very large, in which portion the structure of the refractory forming the sample was deteriorated through oxidation thereof caused by the contact with the open air during the continuous casting, thus revealing a poor oxidation resistance.

In the sample for comparison No. 7, the depth of the portion of the outer refractory layer thereof was large, in which portion the structure of the refractory forming the sample was deteriorated through oxidation thereof caused by the contact with the open air during the continuous casting, because the outer refractory layer of the sample contained the low-melting glass in a small amount outside the scope of the present invention, thus revealing a poor oxidation resistancce.

In the sample for comparison No. 8, the depth of the portion of the outer refractory layer thereof was large, in which portion the structure of the refractory forming the sample was deteriorated through oxidation thereof caused by the contact with the open air during the continuous casting, because the outer refractory layer of the sample contained the low-melting glass in a large amount outside the scope of the present invention and did not contain silicon carbide, thus revealing a poor oxidation resistance.

In any of the samples for comparison Nos. 5 to 8, furthermore, the structure of the refractory forming the sample was deteriorated as described above, thus resulting in a higher breakage ratio of the sample.

Each of the samples of the invention Nos. 1 to 4 had an average service life of 14.9 charges, when counting the continuous casting of molten steel from a 150-ton ladle at one time as one charge, whereas each of the samples for comparison Nos. 5 to 8 showed an average service life of only 11.6 charges under the same condition as described above. This also revealed that the molten steel pouring nozzle of the present invention was excellent in service life.

According to the molten steel pouring nozzle of the present invention, as described above in detail, it is possible to prevent oxidation of the nozzle from the outer surface thereof caused by the contact with the open air and to prevent deterioration of the structure of the refractory forming the nozzle, permitting the stable continuous casting of molten steel for a long period of time, thus providing many industrially useful effect.

What is claimed is:

1. A molten steel pouring nozzle which comprises:
   a nozzle body comprising an alumina-graphite refractory, having, along the axis thereof, a bore through which molten steel flows; and
   an outer refractory layer arranged on an outside portion of said nozzle body so as to be integral with said nozzle body and to be flush with an outer surface thereof, said outer refractory layer being arranged on a portion of said outside portion of said nozzle body, which portion is in contact, when a lower portion of said molten steel pouring nozzle is immersed into molten steel, with the open air without being immersed into said molten steel, and said outer refractory layer consisting essentially of:

| | |
|---|---|
| alumina ($Al_2O_3$) | from 40 to 75 wt. % |
| carbon (C) | from 10 to 30 wt. %, |
| silica ($SiO_2$) | from 1 to 30 wt. %, |
| silicon carbide (SiC) and | from 1 to 20 wt. %, |
| low-melting glass | from 1 to 10 wt. %; and |
| said low-melting glass consisting essentially of: | |
| alumina ($Al_2O_3$) | from 1.5 to 8.0 wt. %, |
| silica ($SiO_2$) | from 20.0 to 56.0 wt. %, |
| calcium oxide (CaO) | from 2.5 to 14.4 wt. %, |
| magnesia (MgO) | from 0.05 to 1.60 wt. %, |
| potassium oxide ($K_2O$) | from 0.25 to 6.40 wt. %, |
| sodium oxide ($Na_2O$) | from 0.5 to 8.0 wt. %, |
| boric acid ($B_2O_3$) and | from 2.5 to 24.0 wt. %, |
| boron carbide ($B_4C$) | from 20.0 to 50.0 wt. %. |

2. A molten steel pouring nozzle as claimed in claim 1, wherein:
   said outer refractory layer of said molten steel pouring nozzle has a thickness within a range of from 1 to 15 mm.

3. A molten steel pouring nozzle as claimed in claim 2, wherein the outer refractory layer consists essentially of 49.2 wt. % alumina, 19.4 wt. % carbon, 19.8 wt. % silica, 9.8 wt. % silicon carbide and 1.8 wt. % low-melting glass.

4. A molten steel pouring nozzle as claimed in claim 2, wherein the outer refractory layer consists essentially of 49.2 wt. % alumina, 19.4 wt. % carbon, 18.8 wt. % silica, 8.1 wt. % silicon carbide and 3.7 wt. % low-melting glass.

5. A molten steel pouring nozzle as claimed in claim 2, wherein the outer refractory layer consists essentially of 49.2 wt. % alumina, 19.4 wt. % carbon, 17.4 wt. % silica, 7.5 wt. % silicon carbide and 6.5 wt. % low-melting glass.

6. A molten steel pouring nozzle as claimed in claim 2, wherein the outer refractory layer consists essentially of 49.2 wt. % alumina, 19.4 wt. % carbon, 16.0 wt. % silica, 6.1 wt. % silicon carbide and 9.3 wt. % low-melting glass.

7. A molten steel pouring nozzle as claimed in claim 2, wherein the low-melting glass consists essentially of 3.1 wt. % alumina, 37.1 wt. % silica, 5.5 wt. % calcium oxide, 0.7 wt. % magnesia, 1.3 wt. % potassium oxide, 4.6 wt. % sodium oxide, 14.4 wt. % boric acid and 33.3 wt. % boron carbide.

8. A molten steel pouring nozzle as claimed in claim 3, wherein the low-melting glass consists essentially of 3.1 wt. % alumina, 37.1 wt. % silica, 5.5 wt. % calcium oxide, 0.7 wt. % magnesia, 1.3 wt. % potassium oxide, 4.6 wt. % sodium oxide, 14.4 wt. % boric acid and 33.3 wt. % boron carbide.

9. A molten steel pouring nozzle as claimed in claim 4, wherein the low-melting glass consists essentially of 3.1 wt. % alumina, 37.1 wt. % silica, 5.5 wt. % calcium oxide, 0.7 wt. % magnesia, 1.3 wt. % potassium oxide, 4.6 wt. % sodium oxide, 14.4 wt. % boric acid and 33.3 wt. % boron carbide.

10. A molten steel pouring nozzle as claimed in claim 5, wherein the low-melting glass consists essentially of 3.1 wt. % alumina, 37.1 wt. % silica, 5.5 wt. % calcium oxide, 0.7 wt. % magnesia, 1.3 wt. % potassium oxide, 4.6 wt. % sodium oxide, 14.4 wt. % boric acid and 33.3 wt. % boron carbide.

11. A molten steel pouring nozzle as claimed in claim 6, wherein the low-melting glass consists essentially of 3.1 wt. % alumina, 37.1 wt. % silica, 5.5 wt. % calcium oxide, 0.7 wt. % magnesia, 1.3 wt. % potassium oxide, 4.6 wt. % sodium oxide, 14.4 wt. % boric acid and 33.3 wt. % boron carbide.

* * * * *